US009813659B1

(12) United States Patent
Tholen et al.

(10) Patent No.: US 9,813,659 B1
(45) Date of Patent: Nov. 7, 2017

(54) DIVERSITY RECEIVER

(71) Applicant: DRONE RACING LEAGUE, INC., New York, NY (US)

(72) Inventors: Lucas J. Tholen, North Mankato, MN (US); David A. Mitchell, Waterville, MN (US); Gregory Keith Anderson, St. Peter, MN (US)

(73) Assignee: DRONE RACING LEAGUE, INC., New York, NY (US)

( * ) Notice: Subject to any disclaimer, the term of this patent is extended or adjusted under 35 U.S.C. 154(b) by 11 days.

(21) Appl. No.: 15/151,962

(22) Filed: May 11, 2016

(51) Int. Cl.
- *H04N 5/455* (2006.01)
- *H04B 1/00* (2006.01)
- *H04B 7/08* (2006.01)
- *H04N 5/265* (2006.01)
- *H04N 5/04* (2006.01)

(52) U.S. Cl.
CPC .......... *H04N 5/455* (2013.01); *H04B 1/0007* (2013.01); *H04B 7/08* (2013.01); *H04N 5/04* (2013.01); *H04N 5/265* (2013.01)

(58) Field of Classification Search
USPC ....... 348/726, 728, 729, 731, 735, 725, 724, 348/720, 719, 718, 711, 707, 706, 705, 348/638, 659, 682, 500, 507, 508, 513, 348/516, 521, 525, 563, 571, 572, 580, 348/423.1, 425.1, 425.4, 433.1, 464, 470, 348/484, 383, 194, 144; 455/63.1, 77, 455/275, 277.1, 418, 562; 375/240.02, 375/293
See application file for complete search history.

(56) References Cited

U.S. PATENT DOCUMENTS

| 5,949,498 A | 9/1999 | Rudolph |
| 5,986,635 A * | 11/1999 | Naka ............... G09G 5/005 348/580 |
| 6,084,931 A * | 7/2000 | Powell, II ......... H04L 7/0334 375/293 |
| 6,175,600 B1 * | 1/2001 | Guillemain ......... H04L 1/206 375/326 |
| 6,308,085 B1 | 10/2001 | Shoki |

(Continued)

FOREIGN PATENT DOCUMENTS

WO   WO 2005041566 A3   5/2005

OTHER PUBLICATIONS

PCT International Search Report and Written Opinion of the International Searching Authority, dated Sep. 7, 2017, PCT Patent Application No. PCT/US2017/027804.

(Continued)

*Primary Examiner* — Jefferey F Harold
*Assistant Examiner* — Mustafizur Rahman
(74) *Attorney, Agent, or Firm* — Vierra Magen Marcus LLP

(57) ABSTRACT

A diversity receiver synchronizes and mixes multiple input signals. In one embodiment, the receiver demodulates the multiple input signals prior to synchronizing, converts the demodulated multiple input signals from analog signals to digital signals, synchronizes the demodulated digital signals, converts the synchronized demodulated digital signals to analog signals and mixes the synchronized demodulated analog signals based on a characteristic of the input signals existing prior to the demodulating.

11 Claims, 4 Drawing Sheets

(56) References Cited

U.S. PATENT DOCUMENTS

| | | | |
|---|---|---|---|
| 6,654,432 B1* | 11/2003 | O'Shea | H04W 84/14 375/354 |
| 7,315,733 B2 | 1/2008 | Ohsuge | |
| 7,428,022 B2 | 9/2008 | Teichner | |
| 8,218,092 B1* | 7/2012 | Cohen | H04N 5/455 348/726 |
| 8,259,029 B2 | 9/2012 | Abdelgany | |
| 8,352,040 B2 | 1/2013 | Arx | |
| 8,965,303 B2 | 2/2015 | Yang | |
| 2002/0008778 A1* | 1/2002 | Grigorian | H04N 7/08 348/484 |
| 2002/0050992 A1 | 5/2002 | Deering | |
| 2002/0150185 A1 | 10/2002 | Meehan | |
| 2003/0204850 A1* | 10/2003 | Ng | H04N 7/165 725/63 |
| 2005/0243219 A1* | 11/2005 | Yun | H03D 3/008 348/725 |
| 2006/0077297 A1* | 4/2006 | Sonobe | H03L 7/07 348/536 |
| 2007/0146550 A1* | 6/2007 | Ikuma | H03J 7/04 348/726 |
| 2007/0174891 A1* | 7/2007 | Gouhara | H04N 5/4401 725/131 |
| 2008/0122957 A1* | 5/2008 | Wu | H04N 5/52 348/255 |
| 2008/0156546 A1* | 7/2008 | Hauck | G06F 3/03545 178/19.01 |
| 2008/0253761 A1* | 10/2008 | Mizuguchi | H04B 10/0799 398/17 |
| 2008/0311874 A1 | 12/2008 | Hoffmeister | |
| 2009/0033555 A1* | 2/2009 | Niu | H01Q 3/26 342/372 |
| 2009/0257487 A1 | 10/2009 | Wang | |
| 2011/0143673 A1 | 6/2011 | Landesman | |
| 2011/0254125 A1* | 10/2011 | Nomasaki | H01L 23/5223 257/532 |
| 2012/0176550 A1* | 7/2012 | Hendrickson | H04N 5/46 348/726 |
| 2012/0317302 A1* | 12/2012 | Silvestri | H04L 65/4076 709/231 |
| 2013/0050486 A1* | 2/2013 | Omer | H04N 21/23614 348/144 |
| 2013/0150012 A1* | 6/2013 | Chhabra | H04W 48/16 455/418 |
| 2014/0071967 A1* | 3/2014 | Velasco | H04L 12/1403 370/338 |
| 2014/0181272 A1* | 6/2014 | Abrams | H04N 5/247 709/219 |
| 2014/0192262 A1* | 7/2014 | Takano | H04N 5/08 348/470 |

OTHER PUBLICATIONS

Cox, "Universal Digital Portable Radio Communications," Proceedings of the IEEE, New York, USA, vol. 75, No. 4, Apr. 1, 1987.
Simunek, et al., "Space Diversity Gain in Urban Area Low Elevation Links for Surveillance Applications," IEEE Transactions on Antennas and Propagation, IEEE Service Center, Piscathaway, NJ, US, vol. 61, No. 12, Dec. 1, 2013.

* cited by examiner

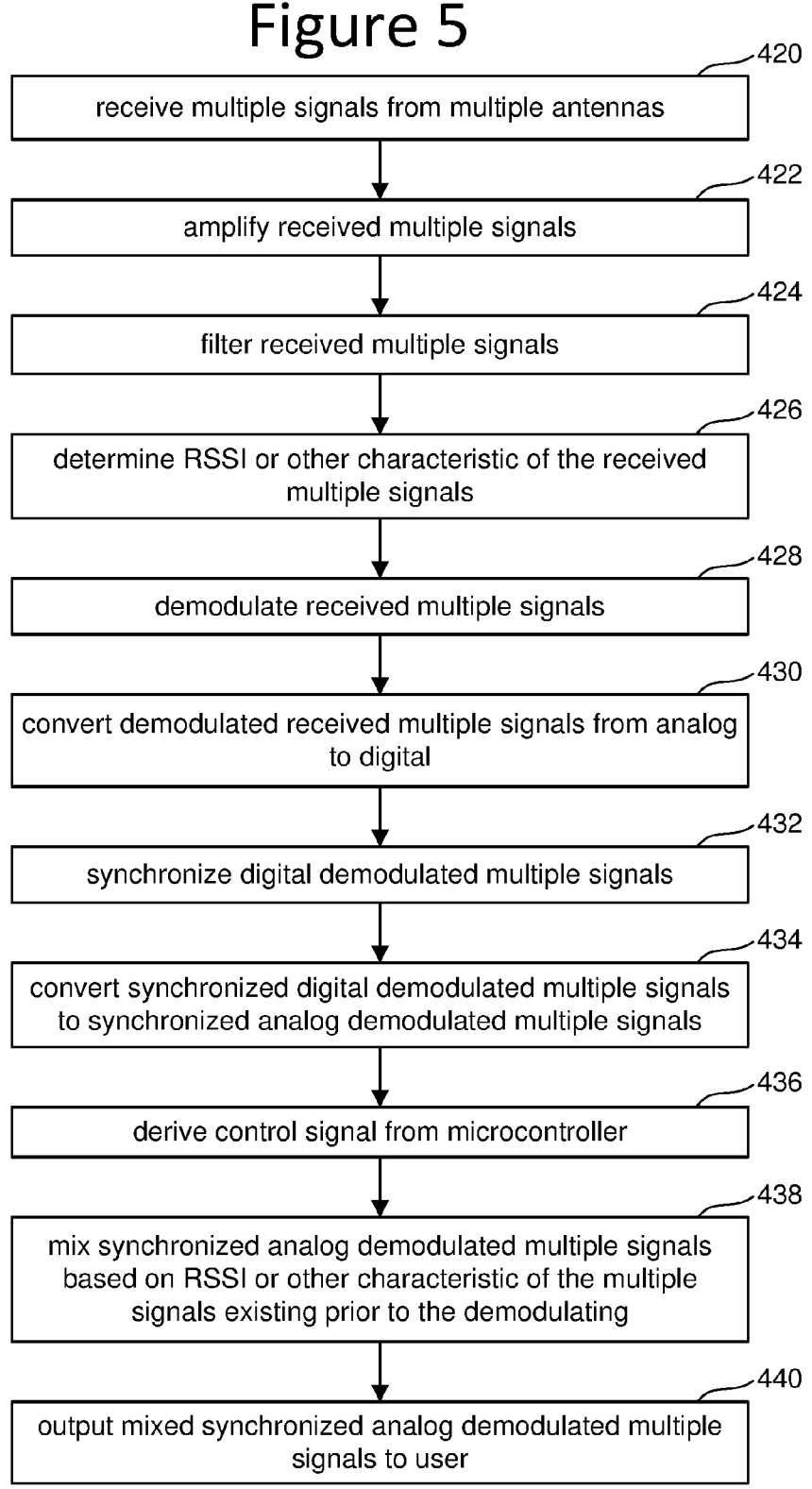

DIVERSITY RECEIVER

BACKGROUND

The technology described herein relates to a diversity receiver

Antenna diversity uses two or more antennas to improve the quality and reliability of a wireless link. Often, especially in urban and indoor environments, there is no clear line-of-sight between transmitter and receiver. Instead, the signal is reflected along multiple paths before finally being received. Each of these bounces can introduce phase shifts, time delays, attenuations and distortions that can destructively interfere with one another at the aperture of the receiving antenna.

Antenna diversity is especially effective at mitigating these multipath situations. This is because multiple antennas offer a receiver several observations of the same signal. Each antenna will experience a different interference environment. Thus, if one antenna is experiencing a deep fade, it is likely that another has a sufficient signal. Collectively such a system can provide a robust link.

Diversity receivers can receive signals from multiple antennas, thereby providing antenna diversity. Some diversity receivers are used to select a best signal path based on received signal strength indicators (RSSI), and an analog switch is then used to pass the chosen signal to the user and block all other signals. When the received signal includes video, the above-described switching can cause discontinuities in the presentation of the video when the diversity receiver switches signal paths.

SUMMARY OF THE DRAWINGS

FIG. 5 is a flow chart describing one embodiment of a process for operating a diversity receiver.

DETAILED DESCRIPTION

Figure 1:
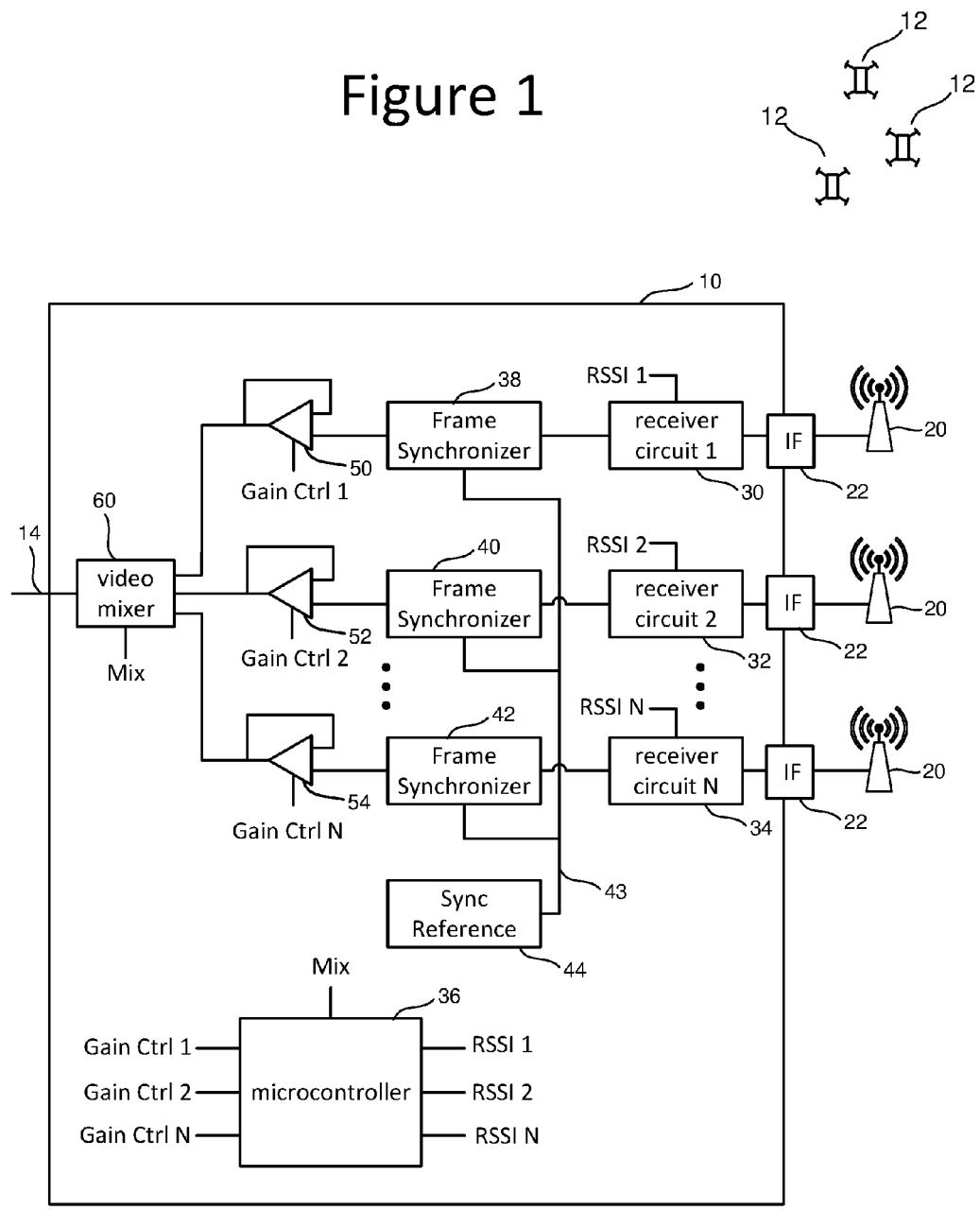
FIG. 1 is a block diagram of one embodiment of a diversity receiver circuit.

A diversity receiver is proposed that synchronizes multiple signals received at the receiver and mixes the synchronized multiple signals. Such a system eliminates the need to resynchronize video after the diversity receiver switches signal paths, thereby, reducing loss of video due to the switching.

In one embodiment, the receiver demodulates the multiple signals prior to synchronizing, converts the demodulated multiple signals from analog demodulated multiple signals to digital demodulated multiple signals, synchronizes the digital demodulated multiple signals, converts the synchronized digital demodulated multiple signals to synchronized analog demodulated multiple signals and mixes the synchronized analog demodulated multiple signals based on a characteristic of the multiple signals existing prior to the demodulating.

The diversity receiver described herein can be used as part of a wireless communications system for use while racing high speed radio controlled unmanned aircraft (i.e. drones) that output low latency video transmission, as well as for other environments involving wireless communication with or without other types of mobile devices. The communications system includes multiple spatially diverse antennas to receive independent video feeds from the unmanned aircraft. Each of the antennas is in communication with one or more diversity receivers to form multiple signal paths from the unmanned aircraft one or more diversity receivers via to the multiple antennas.

One example implementation of the technology described herein includes a drone racing system comprising a plurality of drones, multiple antennas, a plurality of remote controllers that participate in unidirectional or bidirectional communication with the drones using analog communication in order to fly the drones such that each controller communicates with only one drone; a plurality of diversity receivers (e.g., one diversity receiver per drone), and a plurality of head mounted displays (or other types of displays) providing a first person view (FPV) that receive video from the drones via the multiple antennas using analog communication such that each head mounted display receives video from one drone. The controllers each include processors, memory, displays, input devices (buttons, dials, joysticks, knobs, etc), speakers, etc. and are used to remotely pilot the drones. The head mounted displays provide a virtual reality experience so that the pilot wearing the display, but remote from the drone, sees what a pilot in the drone would see via standard or high definition video. The drones can be any type of unmanned aircraft including airplanes, helicopters, other aircraft with multiple propellers (e.g., 4 propellers) or any type of drone design. In some embodiments, the drones will include one or more antennas for wireless communication with the antennas.

In one example implementation, 3-6 drones can race on a course that is indoors and/or outdoors and includes multiple types of terrain and obstacles. In many cases the pilots using the remotes controllers will not have line of sight to the drones during an entire race and will rely on the video received from the drones. The pilots use the remote controllers and the head mounted displays to fly the drones. Because the drones will fly fast and it is a race, the communication of video must be low latency. If a pilot is slow to react to an obstacle in the drone's path due to delays in the video, the drone may crash.

FIG. 1 depicts a diversity receiver 10 in communication with a plurality of unmanned aircraft (e.g., drones) 12. FIG. 1 shows three aircraft (e.g., drones) 12, but in other embodiments more or less than three can be used. In other embodiments, diversity receiver 10 can be in communication with other mobile transmitters. Each unmanned aircraft (e.g., drone) 12 contains a video camera (e.g., NTSC, PAL, SECAM or any other video format) which provides a first person view of the racing event. The NTSC signal generated by drone's camera is frequency modulated onto a carrier frequency and transmitted from the drone to the antennas. In this example, the 5.8 GHz frequency band is used as it is a popular unlicensed band worldwide. Each drone's carrier frequency is set to a unique channel within the 5.8 GHz frequency band to avoid interference, and the channels are allocated to provide both separation from other channels and to avoid creating in-band intermodulation distortion products. The carrier frequencies are chosen to reduce or avoid nonlinear components such as intermodulation products. For example, if the system is using two drones, then their respective carriers can be set 20 MHz apart. An example set of frequencies for a system with six drones include 5645 MHz, 5665 MHz, 5705 MHz, 5725 MHz, 5820 MHz, and 5840 MHz.

The output of diversity receiver 10 is a video signal 14 (e.g., NTSC, PAL, SECAM, or other format) from one of the drones 12 that is provided to a connected display device. The displays can be head mounted displays for first person viewing, computer monitors, televisions, etc. In some cases, more than one display can receive the output of a diversity receiver. Additionally, the output of one or more diversity receivers can be broadcast via one or more television signals. In one embodiment, there is one diversity receiver and one display for each drone. In other embodiments, there can be more than one diversity receiver and/or more than one display for each drone. In some embodiments, some drones will not be associated with a diversity receiver and/or display. In one embodiment, each diversity receiver receives video from each drone and outputs only video for one drone (or other transmitter) to a display. Thus, each diversity received is associated with one drone. In another embodiment, each diversity receiver only receives one video signal.

FIG. 1 shows diversity receiver 10 connected to antennas 20. In one embodiment, there are N antennas. In one embodiment, antennas 20 can be integrated into receiver 10. In other embodiments, antennas 20 can be separate components that are connected to receiver 10 via input interfaces 22. Antennas 20 can be proximal to receiver 10 or remote from receiver 10. When remote, there are communication lines connected at one end to input interfaces 22 and at the other end to antennas 20. The input interfaces can include any one or more of plugs, receptacles for connecting wires, coaxial cables, connectors, connection pads, pins, buffers, surge protectors, filters and impedance matching circuits.

For each antenna of antennas 20, diversity receiver 10 includes a receiver circuit connected to one of the input interfaces 22. For example, FIG. 1 shows N receiver circuits including receiver circuit 30, receiver circuit 32, . . . receiver circuit 34. In one embodiment, each of the receiver circuits 30, 32, 34 will each receive one signal of the multiple signals received by diversity receiver 10 from antennas 20 (representing multiple signal paths) and will amplify, filter and demodulate the received signals. Additionally, each of the receiver circuits 30, 32, 34 provide a Received Signal Strength Indicator (RSSI) output. For example, receiver circuit 30 provides output RSSI 1, receiver circuit 32 provides output RSSI 2, and receiver circuit 34 provides output RSSI N. In one embodiment, RSSI represents the magnitude of the RF signal received by the receiver circuit averaged over time, prior to demodulation (discussed below). In other embodiments, the RSSI represents the average magnitude of the signal after demodulation. Each of the RSSI signals are provided to microcontroller 36, which determines which of the input signals is the strongest.

Each of the receiver circuits 30, 32, 34 outputs a demodulated video output to a Frame Synchronizer circuit. For example, the output video from receiver circuit 30 is sent to Frame Synchronizer circuit 38. The output of receiver circuit 32 is sent to Frame Synchronizer circuit 40. The video output of receiver circuit 34 is sent to Frame Synchronizer circuit 42. Each of the Frame Synchronizer circuits 38, 40, and 42 receives a common sync reference clock source 43 from sync reference circuit 44. Each of the Frame Synchronizer circuits synchronize their input video signals by locking them to the common sync reference clock source 43. Frame Synchronizer circuits 38, 40, and 42 are examples of synchronization circuits that are configured to synchronize multiple signals received at diversity receiver 10.

The output of each of the Frame Synchronizer circuits 38, 40, and 42 are sent to amplifiers 50, 52 and 54 so that gain equalization can be applied as necessary to match the input requirements of video mixer 60. For example, the output video from Frame Synchronizer circuit 38 is provided to amplifier 50, the output of Frame Synchronizer circuit 40 is provided to amplifier 52, and the output of Frame Synchronizer circuit 42 is provided to amplifier 54. Amplifier 50 has its gain controlled by the signal Gain Ctrl 1, which is provided by microcontroller 36. The gain of amplifier 52 is controlled by the signal Gain Ctrl 2, which is provided by microcontroller 36. The gain for amplifier 54 is controlled by the signal Gain Ctrl N which is provided by microcontroller 36.

The output of amplifiers 50, 52 and 54 are provided to video mixer circuit 60. Video mixer circuit 60 is a mixing circuit configured to mix the synchronized multiple signals received at diversity receiver 10 by combining N video input signals using a ratio coefficient (Mix) computed by microcontroller 36 based on RSSI 1, RSSI 2, . . . RSSI N. Video mixer circuit 60 mixes the synchronized and gain equalized video signals based on the ratio coefficient Mix to produce an output video signal 14 in NTSC format (or other format).

In one embodiment, any combination of one or more of receiver circuits (30, 32, 34), Frame Synchronizer circuits (38, 40, 42), amplifiers (50, 52, 54), video mixer circuit 60, sync reference circuit 44 and/or microcontroller 36 can be referred to as a processing circuit. In one embodiment the processing circuit is configured to demodulate the multiple signals prior to synchronizing the multiple signals and the processing circuit is configured to mix the synchronized multiple signals by mixing synchronized demodulated multiple signals based on a characteristic of the multiple signals existing prior to demodulating the multiple signals.

Figure 2:
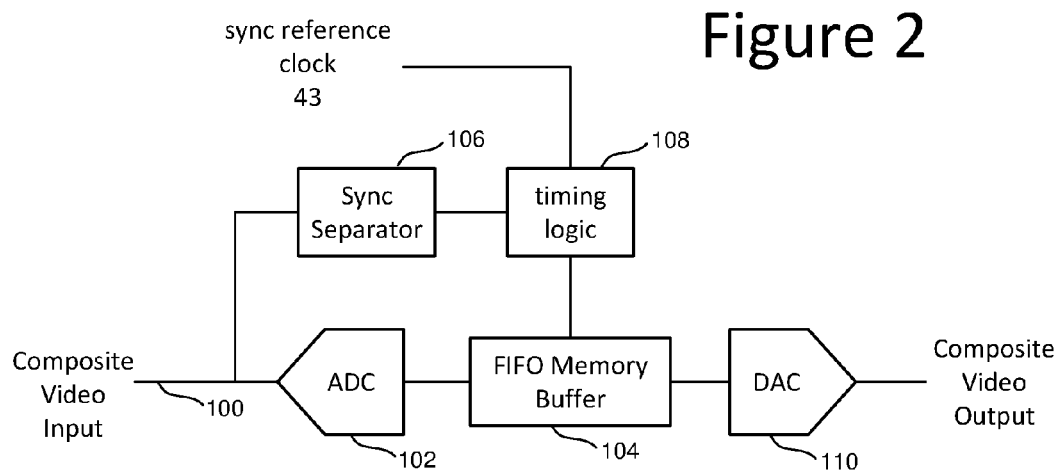
FIG. 2 is a block diagram of one embodiment of a Frame Synchronizer circuit.

FIG. 2 is a block diagram of one embodiment of a Frame Synchronizer circuit (also referred to as a synchronization circuit), such as Frame Synchronizer circuits 38, 40 and 42. The input to the Frame Synchronizer circuit is a demodulated single analog composite NTSC signal 100 which is provided to sync separator circuit 106 and analog to digital conversion circuit 102. A NTSC signal has vertical and horizontal frame sync pulses embedded, which are isolated from the composite form using sync separator circuit 106. This information is combined with the common sync reference clock source 43 and used to trigger the release of information stored in FIFO memory buffer 104. The composite video NTSC input signal is converted from an analog demodulated signal to a digital demodulated signal by analog to digital conversion circuit 102 and then digital video is stored in FIFO memory buffer 104. In one example, the digital signal is stored as a set of video frames. Other formats of storing the video can also be used. Timing logic circuit 108 uses the sync reference clock source 43 in combination with the vertical and horizontal frame sync pulses received from sync separator circuit 106 in order to trigger (ie synchronize) the release of the video frames stored in FIFO memory buffer 104. Those released frames are provided to digital to analog conversion circuit 110, which converts the synchronized digital video to a synchronized analog NTSC video signal for output as the Composite Video Output. Thus, the output of the circuit depicted in FIG. 2 is a synchronized analog demodulated video signal. As all of the video signals received by diversity receiver 10 go through separate Frame Synchronizer circuits in the form of FIG. 2, they are synchronized to the common sync reference clock source 43 and, therefore, they are all in synchronization with each other.

The goal of the diversity receiver is to deliver a continuous, uninterrupted video signal comprised of a combination of multiple video feeds. The ratio of these feeds and the final output signal is determined by analyzing which signal is likely to be the highest quality. In one embodiment, this determination is done by measuring the RSSI of the received FM modulated signals and using those measurements to mix the signals together using video mixer circuit 60.

Figure 3:
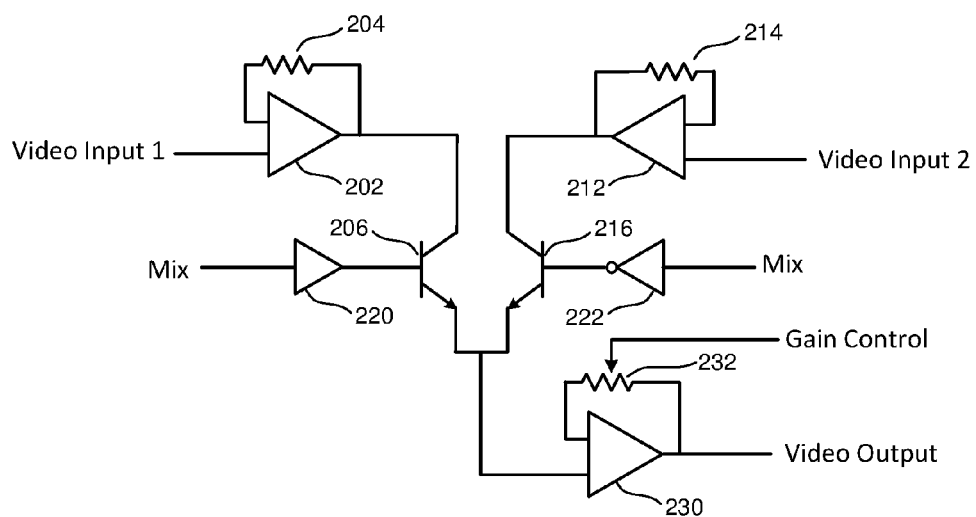
FIG. 3 is a schematic diagram of one embodiment of a mixer circuit.

FIG. 3 is a schematic diagram of one embodiment of mixer circuit 60. The circuit of FIG. 3 mixes two video signals: Video Input 1 and Video Input 2. Video Input 1 is buffered by amplifier 202 and resistor 204. Video Input 2 is buffered by amplifier 212 and resistor 214. The output of amplifier 202 is connected to the collector of transistor 206. The output of amplifier 212 is connected to the collector of transistor 216. The base of transistor 206 receives the ratio coefficient signal Mix via buffer 220. The base of transistor 216 receives an "inverted" version of the ratio coefficient signal Mix via buffer 222. In one embodiment the signal Mix can be between 0 and 2.5 volts, representing zero to 100%. The inversion performed by buffer 222 will output 2.5 volts minus the magnitude of the signal Mix. The emitters of transistors 206 and 216 are connected together and provided as an input to amplifier 230. The other input to amplifier 230 is resister 232 which provides feedback from the output of amplifier 230. Resistor 232 is a variable resistor controlled by the signal Gain Control, which can be output from microcontroller 36, and is used to control the gain of the output signal. The output of amplifier 230, labeled as video output, is provided as the output of diversity receiver 10 (see output 14 in FIG. 1).

As depicted in FIG. 3, Video Input 1 is mixed with Video Input 2 at the connection of the emitters of transistors 206 and 216. The amount of Video Input 1 in the output is based on the signal Mix. The amount of Video Input 2 in the output is also based on the signal Mix. For example, if Mix is 1.25 volts, then the output will include 50% Video Input 1 and 50% Video Input 2. If Mix is at 2.0 volts, then the output will include 80% Video Input 1 and 20% Video Input 2.

In the example of FIG. 3, two video signals are input and combined; however, this circuit can be expanded to support additional video signals (e.g. N video signals). In an expanded embodiment, each video signal would be provided to its own buffer and then its own transistor, with that transistor having an emitter connected to the emitter of transistors 206 and 216. Micro controller 36 can provide multiple ratio coefficient signals to the bases of the various transistors in order to appropriately mix them.

Figure 4:
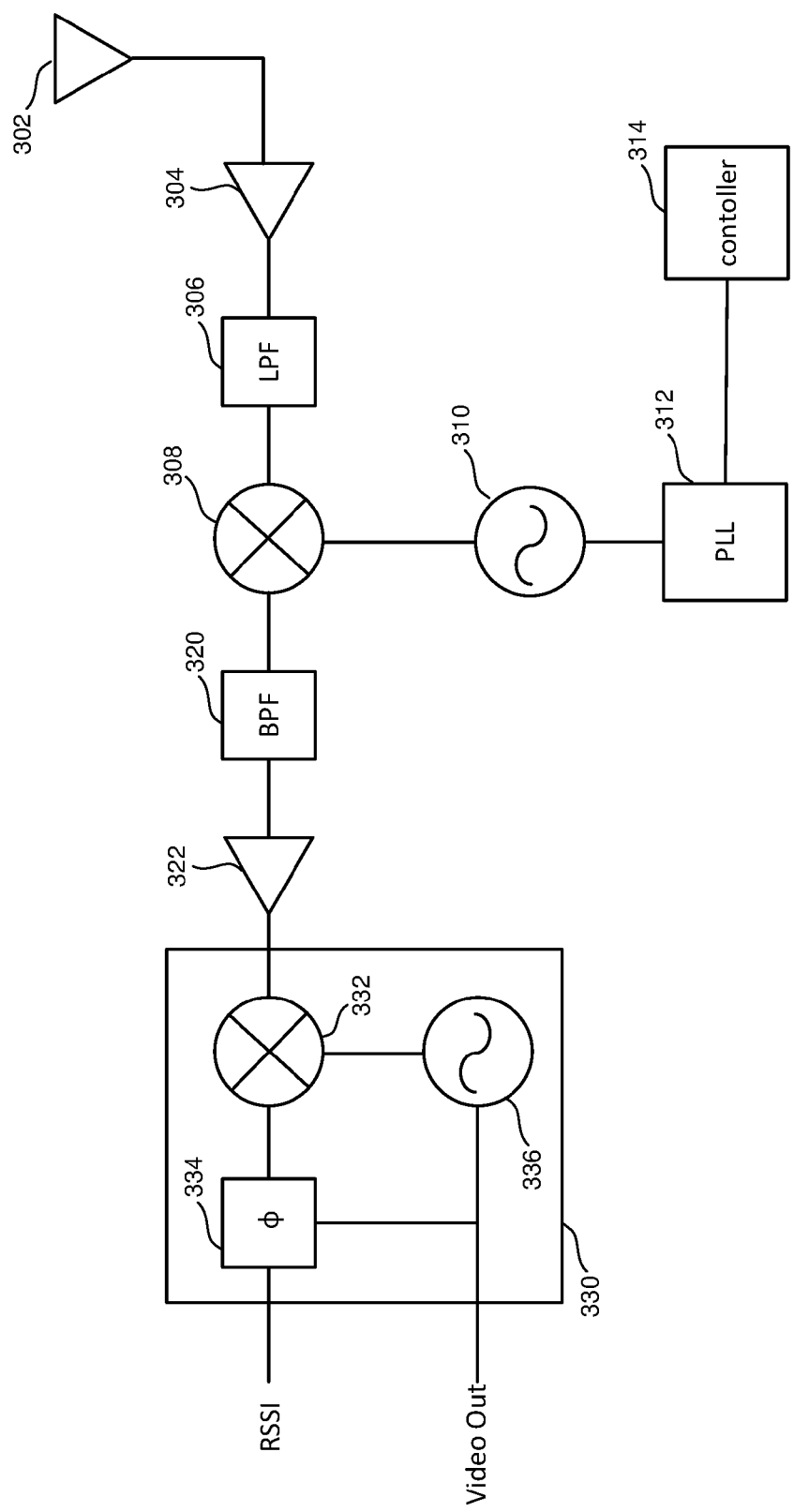
FIG. 4 is a block diagram of one embodiment of a receiver circuit.

FIG. 4 is a block diagram of one embodiment of a receiver circuit (e.g. receiver circuits 30, 32 or 34). The receiver circuit includes an antenna 302. In another embodiment, rather than including the antenna, the receiver circuit will include an input interface for an antenna, such as a connector, plug, etc.—see input interface 22 of FIG. 1. The FM modulated RF input signal is received at antenna or input interface 302 and provided to a low noise amplifier 304 in order to amplify the signal. The amplified signal is then provided to a low pass filter 306 in order to remove noise from the signal. The output of low pass filter 306 is provided to a mixer 308 in order to downconvert the signal to a lower frequency. Mixer 308 is controlled by a voltage controlled oscillator 310, which receives an input from phase locked loop 312. In one embodiment, phase locked loop 312 is a circuit that is controlled by controller 314. Controller 314 and phase lock loop circuit 312 are used to program or otherwise control voltage controlled oscillator 310 in order to program the frequency of down conversion. As discussed above, each drone will operate on its own carrier signal frequency. Depending on which drone this particular receiver is intending to obtain the video for, the appropriate frequency of down conversion will be provided by components 308, 310, 312 and 314. The down converted signal from mixer 308 is provided to band pass filter 320 in order to isolate only the video from the single drone. The output of band pass filter 320 is provided to low noise amplifier 322. The output of low noise amplifier 322 is provided to demodulation circuit 330. The output of demodulation circuit 330 includes the RSSI signal and the analog NTSC output video (Video Out).

One embodiment of demodulation circuit 330 includes mixer 332, phase discriminator circuit 334 and voltage controlled oscillator 336. The signal from low noise amplifier 322 is provided to mixer 332 in order to do a fine frequency adjustment to correct any errors in the carrier frequency. The output of mixer 332 is provided to phase discriminator circuit 334. In one embodiment, phase discriminator circuit 334 has two outputs. The first output is the RSSI. Phase discriminator circuit 334 determines the average peak magnitude of the signal received from mixer 332 prior to demodulation and provides that average as the output signal RSSI. The frequency deviation from the carrier frequency is equal to the amplitude of the original NTSC video signal. Phase discriminator 334 determines that frequency deviation, reconstructs the NTSC video signal and provides the reconstructed the NTSC video signal as the demodulated output indicated in FIG. 4 as Video Out. The output signal Video Out is also used as an error signal fed back to voltage controlled oscillator 336, which creates a reference signal to accommodate Doppler shifts or incorrect signals of the transmitter from the drone or other mobile transmitter. Note that phase discriminator 334 may also include a filter to remove noise. Other demodulation circuits can also be used.

FIG. 5 is a flowchart describing one embodiment of a process for operating the diversity receiver of FIGS. 1-4. In step 420, the diversity receiver receives multiple signals from multiple antennas. Each signal represents a signal received from a different signal path. In one embodiment, the multiple signals include multiple copies of video from a drone. Thus, the multiple signals can include multiple representations of a common video feed received from an aircraft or other mobile transmitter. The signals are received at the receiver circuits 30, 32, 34. In step 422, the received multiple signals are amplified. In step 424, the received multiple signals are filtered. For example, each of the received signals are provided to a different receiver circuits which has its own sets of amplifiers and filters, as depicted in FIG. 4. In step 426, each separate receiver circuits determines an RSSI for its own individual input signal. Alternatively, the receivers can be configured to identify other characteristics of the received multiple signals. In one embodiment, the characteristics determined are of the input signals prior to demodulation and synchronization (discussed below). In other embodiments, the signal characteristics can be determined after demodulation. Another signal characteristics that can be used includes a measurement of signal to noise ratio. Also, in some cases pilot tones are included in the original signal at a known amplitude and phase relationship, and the amount of distortion can then be approximated at the receiving end by comparing the received pilot tones to the reference. In step 428, the receiver circuits demodulate the received multiple signals, as discussed above with respect to FIG. 4.

In step 430 of FIG. 5, the diversity receiver will convert the demodulated received multiple signals from analog to digital. For example, the output of all the receiver circuits (30, 32, 34) are provided to synchronization circuits (38, 40, 42), which convert the analog demodulated signals to digital demodulated signals. This conversation of analog to digital is provided prior to synchronization and prior to the mixing. In step 432, the diversity receiver synchronizes the digital demodulated signals. In step 434, the diversity receiver converts the synchronized digital demodulated multiple signals to synchronized analog demodulated multiple signals. In step 436, microcontroller 36 derives the ratio coefficient (Mix) for mixing the signals together based on the RSSI signals (or other signal characteristics). In step 438, the diversity receiver mixes/combines the synchronized analog demodulated multiple signals based on the RSSI or other characteristic of the multiple signals that existed prior to the demodulating discussed above. In step 440, the diversity receiver outputs the mixed synchronized analog demodulated multiple signals as one composite video signal. The output video signal is provided to a user for display, as discussed above.

The above described diversity receiver mixes the video signal from multiple RF signal paths coherently, based on ratio of received signal strength in the analog domain, and reconstructs a single, seamless video signal. The multiple signal paths are correlated to a continually available reference signal, eliminating the need for a video display to resynchronize and reducing the loss of video due to the resynchronization process.

One embodiment includes a receiver, comprising one or more synchronization circuits configured to synchronize multiple signals received at the receiver and a mixing circuit configured to mix the synchronized multiple signals received at the receiver.

One embodiment includes a method for receiving wireless signals, comprising receiving multiple signals, synchronizing the multiple signals and mixing the synchronized multiple signals.

One embodiment includes a receiver, comprising an input interface configured to receive multiple signals and a processing circuit (connected to the input interface) configured to synchronize the multiple signals and mix the synchronized multiple signals.

One embodiment includes a method for receiving wireless signals, comprising receiving multiple wireless analog video signals, determining signal strength of the multiple wireless analog video signals and mixing the multiple wireless analog signals based on the determined signal strength.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A receiver, comprising:
  multiple receiving circuits that are configured to receive the multiple video signals from multiple signal paths of a common video signal and provide an indication of signal strength of the multiple video signals;
  one or more synchronization circuits configured to synchronize the multiple video signals to each other, the one or more synchronization circuits are configured to synchronize the multiple video signals received from the multiple signal paths to a common reference signal; and
  a mixing circuit configured to mix the synchronized multiple video signals based on the indication of signal strength for each of the multiple signals paths to create a combined video signal.

2. The receiver of claim 1, wherein:
  the multiple receiving circuits are configured to receive FM modulated signals from the multiple signal paths and demodulate the FM modulated signals.

3. The receiver of claim 1, wherein:
  the one or more synchronization circuits are configured to convert received analog video signals to digital video signals, synchronize the digital video signals, and convert the synchronized digital video signals to synchronized analog output video signals.

4. The receiver of claim 1, wherein:
  the multiple video signals received at the receiver are modulated signals;
  the one or more synchronization circuits are configured to synchronize demodulated digital versions of the multiple video signals received at the receiver; and
  the mixing circuit is configured to mix synchronized demodulated analog versions of the multiple video signals received at the receiver.

5. A receiver, comprising:
  one or more synchronization circuits configured to synchronize multiple signals received at the receiver;
  a mixing circuit configured to mix the synchronized multiple signals received at the receiver; and
  multiple receiving circuits that are configured to receive the multiple signals that represent multiple signal paths of a common live video signal wirelessly transmitted from an aircraft, the receiving circuits provide the multiple signals to the one or more synchronization circuits which synchronize the multiple signals in real time.

6. A receiver, comprising:
one or more synchronization circuits configured to synchronize multiple signals received at the receiver; and
a mixing circuit configured to mix the synchronized multiple signals received at the receiver;
the multiple signals are multiple video signals representing a common video stream; and
the mixing circuit mixes the multiple video signals based on a mixing ratio that changes over time without interrupting an output video that comprises the mixed video signals.

7. A method for receiving wireless signals, comprising:
receiving multiple signals that are multiple representations of a common source signal;
synchronizing the multiple signals to each other;
mixing the synchronized multiple signals;
demodulating the multiple signals prior to the synchronizing;
converting the demodulated multiple signals from analog demodulated multiple signals to digital demodulated multiple signals, the synchronizing is performed on the demodulated digital multiple signals; and
converting the synchronized digital demodulated multiple signals to synchronized analog demodulated multiple signals, the mixing is performed on the synchronized analog demodulated multiple signals based on a characteristic of the multiple signals existing prior to the demodulating.

8. The method of claim 7, wherein:
the receiving multiple signals includes receiving multiple live video signals;
the synchronizing the multiple signals includes synchronizing the multiple live video signals; and
the mixing the synchronized multiple signals includes mixing the synchronized multiple live video signals.

9. A receiver, comprising:
an input interface configured to receive multiple signals from multiple signal paths of a common signal; and
a processing circuit, connected to the input interface, configured to synchronize the multiple signals to a common reference signal and mix the synchronized multiple signals received from the multiple signal paths based on a characteristic of the multiple signals from the multiple signals paths, the processing circuit is configured to demodulate the multiple signals prior to synchronizing the multiple signals, the processing circuit is configured to mix the synchronized multiple signals by mixing the synchronized demodulated multiple signals based on the characteristic of the multiple signals existing prior to demodulating the multiple signals.

10. The receiver of claim 9, wherein:
the processing circuit is configured to convert the demodulated multiple signals from analog demodulated multiple signals to digital demodulated multiple signals;
the processing circuit is configured to synchronize the digital demodulated multiple signals;
the processing circuit is configured to convert the synchronized digital demodulated multiple signals to synchronized analog demodulated multiple signals; and
the processing circuit is configured mix the synchronized analog demodulated multiple signals based on the characteristic of the multiple signals existing prior to the demodulating.

11. A method for receiving wireless signals, comprising:
receiving multiple wireless analog video signals that include multiple representations of a common video feed from a common source that have different transmission paths;
determining signal strength of the multiple wireless analog video signals; and
mixing the multiple wireless analog signals based on the determined signal strength to create a combined video signal based on the multiple representations of the common video feed from the common source.

* * * * *

UNITED STATES PATENT AND TRADEMARK OFFICE
CERTIFICATE OF CORRECTION

PATENT NO. : 9,813,659 B1  
APPLICATION NO. : 15/151962  
DATED : November 7, 2017  
INVENTOR(S) : Tholen et al.

Page 1 of 1

It is certified that error appears in the above-identified patent and that said Letters Patent is hereby corrected as shown below:

In the Claims

Column 10, Line 23 (Claim 10, Line 11), please change "configured mix" to -- configured to mix --.

Signed and Sealed this
Twenty-first Day of August, 2018

Andrei Iancu
*Director of the United States Patent and Trademark Office*